Dec. 17, 1929.    P. H. FERRIER, JR    1,739,894
TEAKETTLE
Filed Oct. 25, 1928
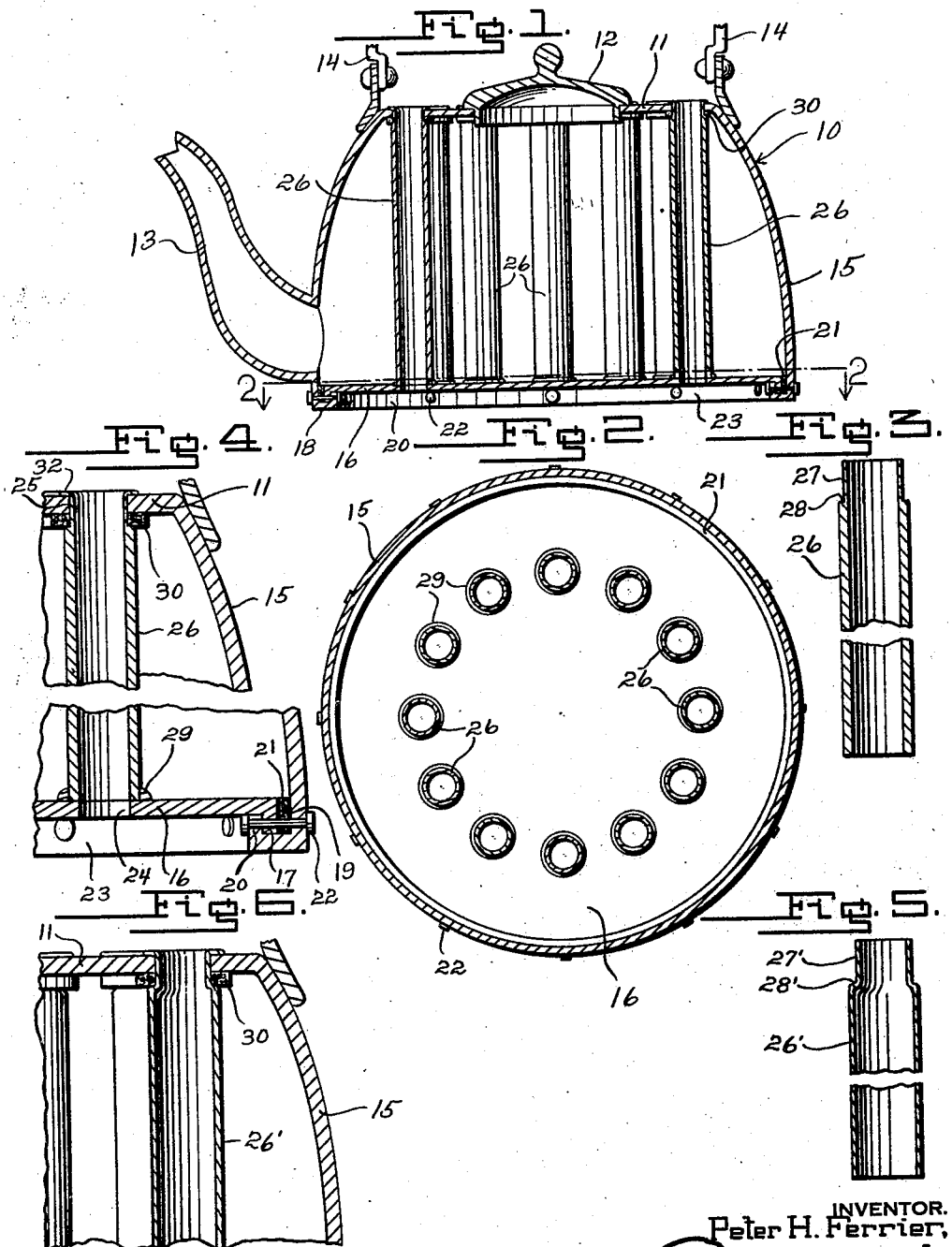
INVENTOR.
Peter H. Ferrier,
Jr.
BY
ATTORNEYS.

Patented Dec. 17, 1929

1,739,894

UNITED STATES PATENT OFFICE

PETER H. FERRIER, JR., OF BROOKFIELD, ILLINOIS

TEAKETTLE

Application filed October 25, 1928. Serial No. 315,071.

The present invention relates to improvements in household utensils, and more specifically to an improved construction for tea kettles.

The primary object of the present invention is to provide a tea kettle embodying features of construction for rapid heating of the contents of the kettle by permitting the heating gases to travel upwardly thru the kettle.

A further object of the invention is to provide an improved tea kettle construction which will permit of the same being die stamped in sections and assembled in such manner as to effectively seal all joints.

A further object of the invention is to provide a tea kettle having a series of heating flues or tubes extending upwardly therethru and having a bottom section of such material as to allow for the tubes to be soldered to the bottom section, and with the upper ends of the tubes adapted to be sealed to the body portion of the kettle which is constructed of such material as to prevent soldering of the upper ends of the tubes to the body portion.

A still further object of the invention is to provide an improved construction for rapid heating tea kettles, which will permit of the kettle being made from copper and aluminum sections without requiring any welding operation.

Other objects and advantages of the invention will be apparent during the course of the following detailed description, taken in connection with the accompanying drawing forming a part of this specification and in which drawing:

Figure 1 is a vertical sectional view thru the improved tea kettle.

Figure 2 is a horizontal section on line 2—2 of Figure 1.

Figure 3 is an enlarged longitudinal section thru one of the heating flues or tubes and showing the construction of the upper end of the tube for connection with the body portion of the kettle.

Figure 4 is an enlarged frgamentary sectional view clearly illustrating the manner in which the tubes are mounted to extend vertically thru the kettle and also the manner in which the bottom section or disc is mounted in the lower portion of the kettle.

Figure 5 is a central longitudinal section thru a modified form of heating flue or tube.

Figure 6 is an enlarged fragmentary section thru the kettle and showing the manner in which the modified form of tube is connected at its upper portion to the top wall of the kettle.

Referring to the drawing in detail, and wherein similar reference characters designate corresponding parts thruout the several views, the numeral 10 may designate the body portion of the tea kettle which is preferably formed from aluminum for rendering the same light in weight and durable. The body portion 10 may taper inwardly at its upper end and is preferably closed at its upper end with a flat top wall 11 provided at its axial center with an opening for receiving a suitable head 12. The kettle is provided with the usual spout 13 and connected with the upper portion of the body portion 10 is a suitable handle or bail 14. The body portion 10 is preferably die stamped or of drawn metal with the annular side wall 15 formed integral with the flat top wall 11. Owing to the fusible nature of aluminum, soldering cannot be readily accomplished for connecting sections of the kettle with a leak-proof connection, and for this reason the kettle or vessel is made from metals of unlike natures connected to form leak-proof connections without requiring soldering or welding of the joints between the sections.

The bottom of the body portion 10 is intended to be closed by a flat bottom plate or disc 16 which is constructed from either sheet brass or copper, and which metal is of a nature less fusible than that of aluminum and will allow for soldering without fusion of the metal. The flat bottom plate or disc 16 is provided at its peripheral edge with a downturned flange 17, with the external diameter of the disc slightly less than the internal dimension of the lower edge of the annular side wall 15. The flat bottom plate or disc 16 is secured in closing relation over the lower end of the body portion 10 thru turning the lower edge of the annular side wall inwardly and then upwardly as at 18 so as to form an internal, upwardly opening annular channel 19 into which the downturned flange 17 projects with the disc 16 resting upon the upturned extension 20. The annular channel 19 is of greater width than the thickness of the flange 17, and arranged within the channel between the flange 17 and annular wall 15 is an asbestos packing ring 21 which is preferably coated with a suitable cementitious material capable of withstanding the heat to which the kettle is subjected. This uninflammable packing ring 21 acts to provide a sealing joint between the lower portion of the body portion 10 and the peripheral edge of the bottom disc 16. The lower turned portion 18 of the annular side wall may be crimped for retaining the sections 10 and 16 connected in leak-proof engagement, but it is preferred that suitable fastening elements such as rivets 22 be extended thru the joint forming sections as clearly shown in Figure 4 for connecting the bottom plate to the annular side wall with a leak-proof joint. Thus it will be seen that the brass or copper bottom plate is effectively connected with a leak-proof connection at its peripheral edge to the aluminum or fusible body portion 10 without the requiring of any soldering or welding.

The upturned extension 20 supports the flat bottom plate 16 in spaced relation above the lower edge of the annular side wall 15 and thus forms a heat collecting chamber 23 extending beneath practically the whole bottom area of the kettle. The flat bottom plate 16 is provided with a series of annularly arranged circular openings 24 which are preferably arranged in a circle concentric to the axis of the bottom plate. The flat top wall 11 of the body portion 10 is provided with an annularly arranged series of circular openings 25 which are arranged concentric to the axis of the top wall and with each of the openings 25 in axial alignment with one of the openings 24 of the bottom plate 16.

Adapted to extend vertically thru the body 10 between axially aligning openings 24 and 25, is a series of tubular heat conducting flues 26 which are preferably formed from copper and act to conduct heating gases from the chamber 23 upwardly thru the interior of the body portion 10 for escape above the top wall 11. It may here be well to state that the openings 25 are of slightly less diameter than the diameter of the openings 24, with the diameter of the openings 24 equal to the internal diameter of the tubes 26 and the diameter of the openings 25 less than the external diameter of the tubes. The upper end portion of each tube 26 is reduced in external diameter as by machining as at 27 to form an external upwardly facing annular shoulder 28. This reduced upper end 27 is of a diameter to snugly fit in the openings 25. The tubes 26 at their lower ends are soldered as at 29 to the upper surface of the flat bottom plate 16 so that the tubes align axially with the openings 24. This soldering of the tubes 26 can readily be accomplished owing to the nature of the metals of which the tubes and bottom plates are formed. Owing to the fusible nature of the light aluminum body portion 10 however, soldering of the upper ends of the tubes to the body portion would be impractical and therefore the tubes are connected at their upper ends by a novel sealing arrangement which will not require soldering.

A fiber gasket 30 encircles the reduced upper end 27 of each tube 26 and rests upon the annular shoulder 28. These fiber gaskets 30 are intended to seal the connections of the upper ends of the tubes 26 with the top kettle wall 11.

In assembling the kettle, the heating tubes 26 are first secured to the upper side of the bottom plate or disc 16 as by the soldered joints 29 with the tubes extending in parallel relation and in circular formation with one tube aligning with each of the openings 24. The assembly of tubes and bottom plate is then inserted upwardly into the hollow body portion 10 with the upper reduced ends of the tubes projecting thru the openings 25 in the kettle top wall 11. It will here be noted that the length of the reduced upper ends of the tubes 26 is greater than the thickness of the top wall 11. The tubes are passed upwardly thru the openings 25 until the gaskets 30 engage the under side of the flat top wall 11 and then the projecting upper ends of the tubes are spread and rolled over the upper face of the top wall 11 to form a locking flange 32. This rolling of the upper ends of the tubes creates a binding action on the gaskets 30 between the shoulders 28 and under surface of the top wall 11 so that the gaskets 30 seal the joints where the tubes pass thru the kettle top wall. The lower edge of the annular side wall 15 may then be turned inwardly and upwardly as at 18 over the downturned flange 17 for securing the peripheral edge of the plate 16 to the lower edge of the body portion 10 in a manner as previously set forth. The asbestos packing ring 21 may be cemented to the flange 17 prior to inserting the plate 16 into the body portion 10.

Thus it will be seen that by so connecting the assembly including the disc 16 and tubes 26 to the readily fusible aluminum body portion 10 without requiring soldering or welding operations for sealing the connections, that the body portion 10 may be formed of light and durable metal such as aluminum without likelihood of injury being done the body portion. The construction as shown will also allow for the sections of the kettle to be products of die stampings.

With the modified form of tube 26' shown in Figures 5 and 6, the reduced upper end 27' of the tube is provided by contracting the upper end of the tube for formation of the annular shoulder 28' providing a seat for the gasket 30. With the type of tube shown in Figures 5 and 6, the reduced upper end of the tube forms a slighty constricted passageway at the upper end of the tube which will act to slightly retard passage of the heating gases upwardly thru the tube. The heating tubes 26' may be formed from brass or copper and secured at their lower ends to the plate 16 in a like manner as that of the tubes 26.

From the foregoing description it will be apparent that a novel and improved construction for quick heating household utensils such as tea kettles and the like has been provided wherein the contents of the vessel will be quickly heated with a minimum amount of fuel consumption. It will also be apparent that a novel arrangement has been provided wherein the body portion of the kettle may be formed from a light and easy fusible material such as aluminum which will not deteriorate nor become unsightly in appearance thru use, with a novel means for attachment of the heating unit including the bottom plate and heating flues, to the easily fusible aluminum body portion without requiring any soldering or welding operations and yet providing sealed joints capable of withstanding the heat to which the kettle will be subjected. Further, the arrangement will permit of tea kettles being formed from copper and aluminum stampings without requiring welding operations to assemble the stampings.

Changes in detail may be made to the forms of invention herein shown and described, without departing from the spirit of the invention or the scope of the following claims.

I claim:

1. A liquid heating vessel comprising a hollow body portion having an open lower end and a top wall provided with a filler opening, a closure for the filler opening, a flat bottom plate closing the lower open end of the body portion and having a depending peripheral flange, a packing ring arranged between the flange and lower edge of the body portion, and means for securing the plate in position with the packing ring sealing the joint between the plate and body portion.

2. A liquid heating vessel comprising a hollow body portion having an open lower end, a flat bottom plate for closing the lower end of the body portion and having a downturned peripheral flange, a packing ring encircling the flange, and means for securing the plate to the body portion below the plate.

3. A liquid heating vessel comprising a hollow body portion having an open lower end, a flat bottom plate for closing the lower open end of the body portion and provided with a downturned peripheral flange, a packing ring encircling the flange, said body portion to have its lower edge turned inwardly and upwardly about the plate flange to provide an annular channel for receiving the flange and packing ring, and fastening elements extending thru the peripheral flange and channel forming portions of the body portion for securing the plate to the body portion.

4. A tea kettle comprising a body portion formed of easily fusible material and having an open lower end, a flat plate for closing the lower open end of the body portion, formed of a material less fusible than that of the body portion and having a downturned peripheral flange, a packing ring encircling the peripheral flange for engagement with the interior of the body portion, and means for securing the plate to the body portion with the gasket forming a sealing joint between the plate and body portion.

5. A tea kettle embodying an aluminum body portion having an open lower end, a copper plate for closing the lower open end of the body portion and formed with a downturned peripheral flange, an asbestos packing ring encircling the downturned flange for engagement with the internal wall of the body portion, and means connecting the plate to the body portion for compressing the packing and sealing the joint between the plate and body portion.

6. A liquid heating vessel comprising an aluminum body portion having a top wall provided with a filler opening and an annular side wall having an inwardly and upwardly turned lower edge providing an internal annular channel, a closure cap for the filler opening, a bottom closure disc of less fusible nature than that of the body portion, resting upon the upturned portion of the annular side wall and having a downturned peripheral flange extending into said annular channel, an asbestos packing ring arranged in the channel between the downturned flange and annular side wall of the body portion, and fastening elements extending through the channel and downturned flange for connecting the closure disc to the body portion.

7. In a tea kettle construction, a hollow body portion being open at its lower end and including an annular side wall and a flat top wall provided with a filler opening, said top wall about the filler opening having an annular series of openings, a closure for the filler opening, a disc fitting in the lower portion of the annular side wall and having a downturned peripheral flange, a packing gasket between the flange and annular side wall, means for attaching the disc to the side wall, said disc having an annular series of openings arranged co-axial with the annular series of openings in the top wall, a heating tube secured at its lower ends to the disc at each of the openings therein, said tubes at their upper ends extending thru the openings in the top wall, and means sealing the upper ends of the tubes to the top wall.

8. In a tea kettle construction, a hollow body portion including an annular side wall and a flat top wall provided with a closure, a disc secured inwardly of the lower portion of the annular side wall and provided with openings, said top wall having openings aligning axially with the openings in said disc, a heating tube secured to the disc at each of the openings therein and having reduced upper ends projecting thru the openings in the top wall, said reduced upper ends providing an annular shoulder below the top wall, a gasket encircling the tube and resting upon the shoulders for engagement with the under side of the top wall, and a rolled locking flange at the upper end of each tube overlying the upper surface of the top wall.

9. In a tea kettle construction, an aluminum body portion including an annular side wall and a flat top wall provided with an annular series of openings, a closure disc of less fusible metal than that of the body portion secured in sealing relation at its peripheral edge to the lower portion of the annular side wall, said disc having an annular series of openings with each opening aligning coaxial with an opening in the top wall, a heating tube soldered to the upper face of the disc at each opening therein and having a reduced upper end projecting thru the openings in the top wall, said reduced upper ends providing an annular shoulder below the top wall, a fiber gasket encircling the reduced upper end between the shoulder and top wall, and a locking flange rolled from the upper end of each tube upon the upper surface of the top wall for sealing the upper ends of the tubes in the top wall.

10. In a tea kettle construction, a body portion having a top wall provided with openings, and a heating unit including a closure disc for the lower end of the body portion and having openings therethru, a heating tube projecting upwardly from the disc at each opening therein and having reduced upper ends for projecting thru the openings in the top wall, said reduced upper ends forming an annular shoulder, a gasket resting upon the shoulder for engagement with the under side of the top wall, and a flange rolled over the upper side of the top wall, said flange being formed from the projecting upper end of the tube.

11. In a tea kettle construction, a body portion having a flat top wall provided with an annular series of openings, a disc closing the lower end of the body portion and having an annular series of openings, a tube secured to the upper face of the disc at each of the openings, said tubes having constricted upper ends providing an external shoulder, said constricted upper ends to project thru the openings in the top wall, a gasket encircling the tube and resting upon the shoulder for engagement with the under side of the top wall, and a locking flange formed by rolling the projecting upper ends of the tubes into engagement with the upper surface of the top wall.

PETER H. FERRIER, Jr.